Dec. 16, 1958  B. CAMPRUBI  2,864,157
METHOD OF MAKING COMMUTATORS
Filed Dec. 2, 1954  2 Sheets-Sheet 1

Dec. 16, 1958  
B. CAMPRUBI  
2,864,157  
METHOD OF MAKING COMMUTATORS  
Filed Dec. 2, 1954  
2 Sheets-Sheet 2
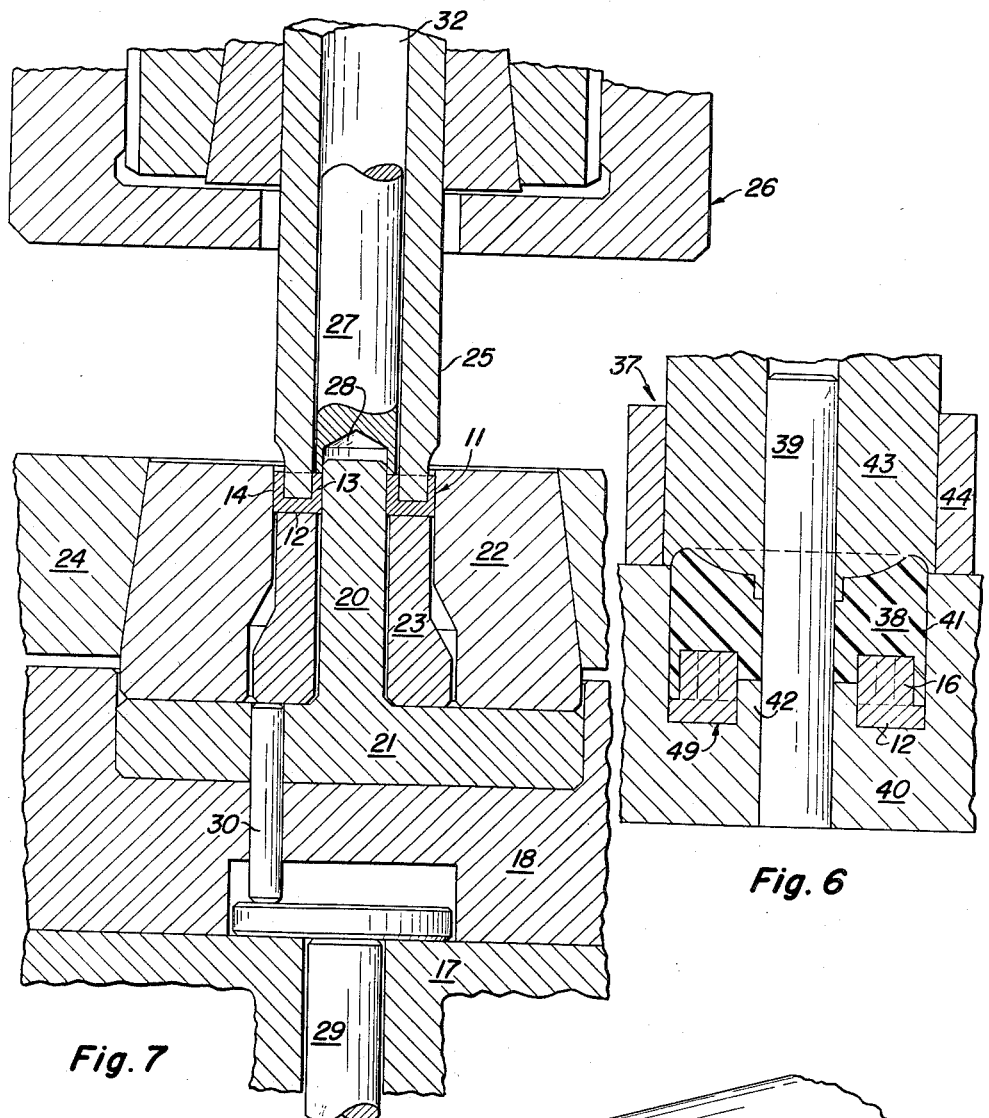
Fig. 6
Fig. 7
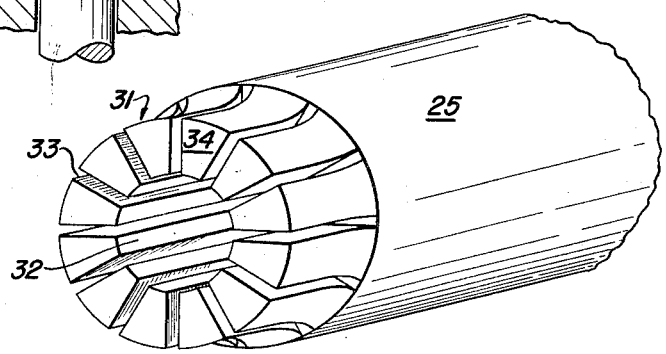
Fig. 8

United States Patent Office 2,864,157
Patented Dec. 16, 1958

2,864,157

METHOD OF MAKING COMMUTATORS

Bartholomew Camprubi, Perivale, Greenford, England, assignor to The Hoover Company, North Canton, Ohio, a corporation of Ohio Application December 2, 1954, Serial No. 472,753

Claims priority, application Great Britain February 26, 1954

1 Claim. (Cl. 29—155.54)

The present invention relates to electric motors and more particularly to the method of making commutators therefor and especially commutators of the face or axial contact type.

According to the broad aspects of the present invention a blank is formed from a body of ductile metal in the form of an annular disc having a free face and with radial tangs extending from the opposite face. The tangs are deformed to form radial shoulders, insulating material is molded about the tangs and disc leaving its free face free of insulating and the disc is severed between the tangs to form individual radially-extending segments having radial tangs extending axially therefrom and embedded in insulating material.

Specifically, according to the present invention, a commutator is formed from a ring of soft copper which is coined or impact extruded into a blank having inner and outer annular walls extending from one face of a disc which eventually forms the face-type commutator segments. The space between the annular walls is divided into a plurality of segmental chambers corresponding in number to the number of segments needed in the finished commutator.

The segmental chambers are separated by radial walls which eventually will form the tangs by which the segments are anchored to the insulating core. The inner and outer annular walls are then machined away leaving the annular disc with the radial tangs extending from one face thereof. The tangs are then twisted to form radial lands or shoulders to prevent the finished segments from being thrown out of the insulating core under the action of centrifugal force when the commutator is rotated. The blank thus formed is placed in a suitable mold and insulating material molded about the tangs and disc leaving one face of the disc free after which the annular disc is severed midway between the tangs by a saw cut or otherwise to form the finished face-type segments.

Figure 1:
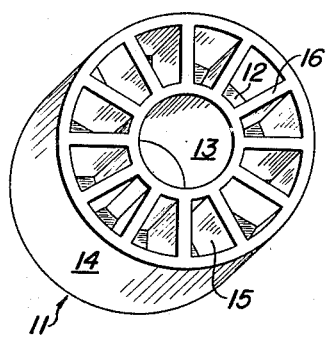
Figure 2:
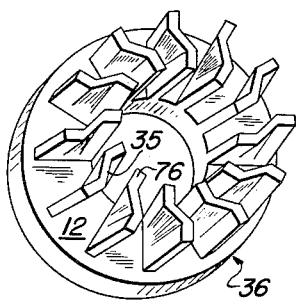
Figure 3:
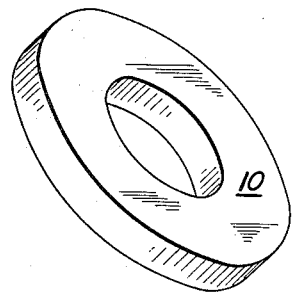
Figure 4:
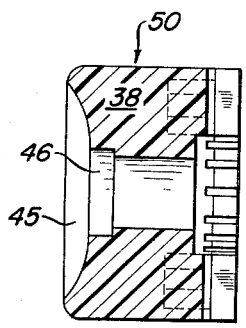
Figure 5:
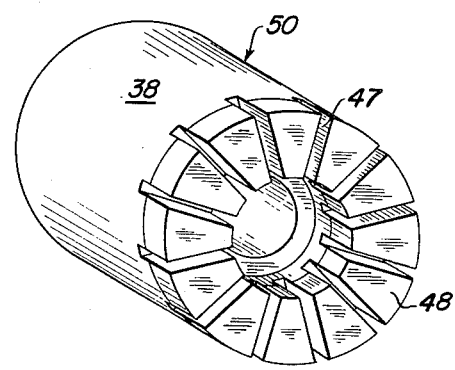

Other objects and advantages of the present invention will become apparent as the description proceeds when taken in connection with the accompanying drawings in which:

Fig. 1 is a perspective view of the blank formed by the impact extruding apparatus of Figs. 7 and 8, Fig. 2 is a perspective view of the blank of Fig. 1, after the annular walls have been removed and the tangs twisted, Fig. 3 is a perspective view of the blank from which the blank of Fig. 1 is extruded, Fig. 4 is a longitudinal cross-sectional view of the finished commutator made according to the invention, Fig. 5 is a perspective view of the face of the commutator made according to the invention showing how the segments are divided, Fig. 6 is a cross-sectional view of a mold showing the insulation being molded about the commutator, Fig. 7 is a vertical sectional view of an impact extrusion press by which the blank of Fig. 1 may be formed and Fig. 8 is a perspective view of the male punch of the press of Fig. 7.

According to the present invention an axial or face-type commutator may be formed from the disc 10 of Fig. 2, first by impact extruding the blank 11 of Fig. 1, forming the blank 36 of Fig. 2 from the blank 11, molding insulating material about the blank 36 to form an uncompleted commutator 49 and finally severing the axially facing disc 12 to form the completed commutator 50 of Figs. 4 and 5.

The commutator according to the present invention is made from a circular flat disc 10 (Fig. 3) of soft copper which is first impact extruded into a blank 11 in the form shown in Fig. 1 by means of the apparatus of Figs. 7 and 8.

The blank 11 comprises an end disc 12 with inner and outer annular walls 13 and 14, respectively, extending from one face thereof leaving the other face free. The space between the walls 13 and 14 is divided into a plurality of segmental spaces 15 separated by radial walls 16.

The impact extruding press of Figs. 7 and 8 includes a base 17 and a pressure plate 18 upon which the die proper rests. The die includes a forming pin 20 extending upwardly from a plate 21, a female forming die 22 and an anvil 23. The forming pin 20 has an outside diameter the same as the inside diameter of the blank 11 and the female forming die 22 has an inside diameter the same as the outside diameter of the disc 10 and of the blank 11. A positioning plate 24 has a tapered opening which interfits with the outside tapered wall of the female die 22 to hold the latter in position.

The male forming punch 25 is reciprocably mounted in the head of the press generally indicated by the reference numeral 26. The punch 25 is guided by a guide pin 27 formed with a recess 28 in its lower end having an inside diameter the same as the outside diameter of the forming pin 20 so as to accurately position the lower end of the punch 25 relative to the cavity in the forming die 22. An ejector rod 29 acts upon the ejector pin 30 to raise the anvil 23 and eject the blank 11 after the forming operation in a manner well known in the art.

The operation of the impact extrusion press of Fig. 7 is well known and need not be described in detail herein except to explain how the blank 11 is formed.

The lower end of the punch 25 is shaped as shown in Fig. 8. Its lower end is reduced in diameter as shown at 31, has a bore 32 and is radially slotted as shown at 33 to form segmental lands 34. The inside diameter of the bore 32 is the same as the outside diameter of the wall 13 of blank 11 while the outside diameter of the reduced portion is the same as the inside diameter of the wall 14 of blank 11, the radial slots are of the same dimensions as the radial walls 16 of blank 11 and the segmental lands 34 are of the same dimensions as that of the segmental cavities 15 of blank 11.

In forming the blank 11 the disc 10 is placed over the forming pin 20 on top of the anvil 23 and within the cavity formed in the female die 22.

The punch 25 is then forced downwardly by impact on top of the disc 10 in a well known manner to cause the metal of the disc to cold-flow upwardly into the space between the reduced end 31 of punch 25 and the internal wall of the female die 22 to form the outer annular wall 14 of blank 11, upwardly into the space between the forming pin 20 and the bore 32 of punch 25 to form the inner annular wall 13 of blank 11 and upwardly into the slots 33 to form the radial walls 16 of blank 11. It is to be noted that the punch 25 is not completely moved downwardly against the anvil 23 so as to form the end disc 12 of blank 11.

The press of Fig. 7 may then be operated in a well known manner to eject the blank 11 from the forming die.

The wall 14 of blank 11 is then removed down to the disc 12 by turning in a lathe or otherwise. The wall 13 including an interior portion of disc 12 may then be removed by broaching or otherwise leaving the disc 12 with the radial tangs 16 extending from one face thereof.

It is obvious that by forming the dies of the press of Figs. 7 and 8 in the proper manner the blank 36 as it appears in Fig. 2 could be formed directly by impact extrusion. Alternately either the wall 13 or the wall 14 could be omitted by proper forming of the dies. The important thing is the formation of blank 36 in the form of an annular disc having a free axial face and with the radial tangs 16 extending axially from its opposite face.

The tangs 16 are then twisted at 35 into the configuration shown in Fig. 2 to form the blank 36. It is to be noted that the twists 35 form offset shoulders in a radial direction for a purpose which will presently appear. The radial shoulders may be formed in other ways, for example, during the extrusion process or in a forming press.

The blank 36 of Fig. 2 is then placed in a mold 37 of Fig. 6 and the insulating material 38 molded about the tangs 16 and disc 12 leaving one face free of insulation. The mold 37 includes a centering pin 39 having an outside diameter the same as that of the shaft to which the finished commutator is to be applied. The centering pin 39 extends centrally upwardly thru a cavity 41 in a female die 40 formed with an upwardly extending collar 42. The inside diameter of the cavity 41 is the same as the outside diameter of disc 12 and the outside diameter of collar 42 is the same as the inside diameter of blank 36. The male die 43 is in the form of a plunger reciprocally mounted within the sleeve 44. The lower end of plunger 43 is bulged downwardly so as to form a concave cavity 45 and a recess 46 in the finished commutator as shown in Fig. 4. The operation of the mold 37 of Fig. 6 in molding the insulation 38 about the blank 36 is well known and need not be described in detail herein.

After the molding operation the unfinished commutator is removed from the mold 37 and the metal of disc 12 severed by saw cuts 47 midway between the tangs 16 to form individual axially-facing segments 48. It is to be noted that the saw cuts extend into the insulation 38 to make certain that the metal of the disc 12 is completely severed between the segments 48.

The twists 35 in segments 48 form overhanging shoulders which prevent the segments 48 from flying outwardly of the insulation 38 under the influence of centrifugal force caused by a rapid rotation of the commutator.

From the foregoing description it can be seen that according to the method of the present invention an axially facing commutator may be formed simply, inexpensively and on a mass-production basis.

While I have shown and described but a single embodiment of my invention it is to be understood that that embodiment is to be taken as illustrative only and not in a limiting sense. I do not wish to be limited to the particular method and structures shown and described but wish to include all equivalent variations thereof except as limited by the scope of the claim.

I claim:

The method of forming a radial face-type commutator from an annulus of ductile metal comprising, impact extruding said annulus to form a blank having a flat annular ring at one end with inner and outer annular walls extending normal to one face of said ring at the inner and outer concentric edges thereof connected by radial walls corresponding in number to that of the number of segments to be formed in the finished commutator, removing said annular walls from said ring to form a second blank comprising said annular ring and said radial walls in the form of tangs extending normal to one face of said ring, deforming said tangs to form radially overhanging shoulders thereon, molding an insulating material about said tangs and ring leaving one face of said ring free of insulating material and severing the metal of said ring between said tangs to form individual axially-facing segments embedded in said insulating material whereby said shoulders prevent said segments from flying outwardly against the action of centrifugal forces caused by a rapid rotation of the commutator.

References Cited in the file of this patent

UNITED STATES PATENTS

| | | |
|---|---|---|
| 2,320,541 | Wilson | June 1, 1943 |
| 2,455,864 | Hanna | Dec. 7, 1948 |
| 2,674,784 | Roberts et al. | Apr. 13, 1954 |
| 2,688,793 | Carlson | Sept. 14, 1954 |

FOREIGN PATENTS

| | | |
|---|---|---|
| 677,779 | Great Britain | Aug. 20, 1952 |